A. RING.
APPARATUS FOR MOLDING CEMENT BLOCKS.
APPLICATION FILED APR. 23, 1910.
985,063.
Patented Feb. 21, 1911.
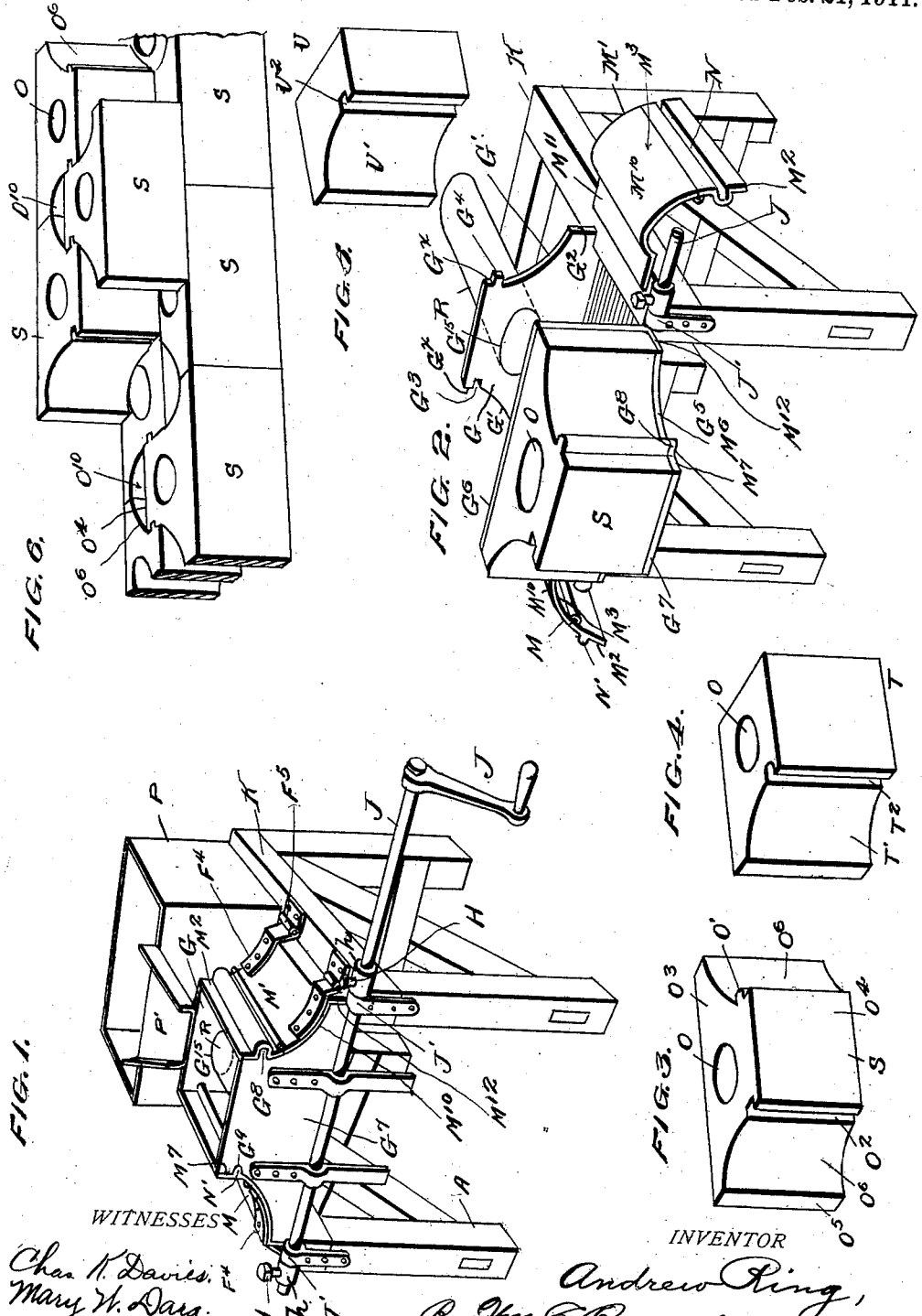

UNITED STATES PATENT OFFICE.

ANDREW RING, OF DUBUQUE, IOWA.

APPARATUS FOR MOLDING CEMENT BLOCKS.

985,063.   Specification of Letters Patent.   Patented Feb. 21, 1911.

Application filed April 23, 1910. Serial No. 557,256.

*To all whom it may concern:*

Be it known that I, ANDREW RING, citizen of the United States, residing at Dubuque, in the county of Dubuque and State of Iowa, have invented certain new and useful Improvements in Apparatus for Molding Cement Blocks, of which the following is a specification.

My invention relates to devices for molding cement blocks, and it relates particularly to a molding device whereby cement blocks adapted to interlock with each other may be quickly and economically molded.

Among the objects in view is to produce a device of the character described which will be of extremely simple and inexpensive construction and efficient in operation.

The invention consists in the novel construction, arrangement and combination of parts as hereinafter fully described, illustrated in the accompanying drawings and pointed out in the appended claims.

In the drawings:—Figure 1 is a perspective view, partly broken away, of my improved molding device, showing the same in its closed or molding position. Fig. 2 is a similar view showing the device in open position for the removal of the cement block. Fig. 3 is a perspective view of one of the blocks produced by my machine. Figs. 4 and 5 are perspective views of corner blocks. Fig. 6 is a perspective view showing a portion of a wall constructed of blocks produced by my machine.

In carrying out my invention I provide a suitable supporting frame or table A. The mold proper comprises the vertically-arranged member or wall G which is, preferably, fixedly mounted on the horizontal beams K of the frame A. The member G is cut away at its lateral edges so as to leave the curved edges G' and straight or plane edges $G^x$, $G^2$, one of the edges $G^x$ being provided with a groove $G^3$ and the other edge $G^x$ being provided with a tenon or lip $G^4$.

$G^5$ indicates a movable or swinging member of the mold, comprising the member $G^6$, integral with or secured to the member $G^7$. When the mold is in its closed or molding position the member $G^6$ occupies a horizontal position forming the floor of the mold, and the member $G^7$ standing vertically. The member $G^5$ is secured upon a horizontally arranged rod J pivotally mounted in bearings J' and secured in proper position as by collars $h$ secured by set screws H to the rod J. The rod J carries an operating handle $J^2$ by which the rod may be turned. By means of the rod and its operating handle the member $G^5$, may be swung from the closed position seen in Fig. 1 into the open position seen in Fig. 2. The member $G^7$ is cut away at its lateral edges to form curved edges $M^6$ and straight edges $M^7$ $M^{12}$. The curvature of the edges $M^6$ corresponds to that of the edges G' on member G.

$G^8$ is a tenon or lip formed on member G on its edge $M^7$, while $G^9$ is a groove formed in the edge $G^6$, said tenon and groove corresponding to the tenon and groove of the member G.

M, M' indicate the remaining members of the mold, each comprising sections $M^2$, $M^3$ preferably hinged together as at $M^4$.

$F^4$ indicate two metallic straps secured to each of the members M M' and hinged as at $F^5$ to the beams K.

By the described construction the sections $M^2$ may when desired, be swung outwardly on their hinges $M^4$, and the sections $M^3$ may also be swung outwardly by swinging the straps $F^4$ on their hinges $F^5$, as seen in Fig. 2.

The sections $M^3$ are so shaped as to present curved portions $M^{10}$ and the straight portions $M^{11}$. The curvature of the portions $M^{10}$ corresponds with the curvature of the edges $M^6$ of sections $G^7$, and when the mold is closed, the curved portions of sections $M^{10}$ lie against the said curved edges $M^6$, and the straight portions $M^{11}$ lie against the straight edges $G^2$ $M^{12}$ of sections G $G^7$.

The sections $M^2$ are shaped so as to lie against the straight edges $M^7$ when the mold is closed and the groove N in one of the sections $M^2$ receives the tenons $G^4$, $G^8$, while the tenon or lip N' in the other section $M^2$ enters the grooves $G^3$ $G^9$.

The member G is provided with an opening $G^{15}$ through which a correspondingly-shaped mandrel or form R may be inserted, extending across the mold and up against the member $G^7$, whereby when the cement is filled into the mold, an air passage, as O, will be formed within the cement block.

The mold proper is left open at the top whereby cement may be readily introduced, said cement being preferably carried within a receptacle P resting upon the frame, a suitable chute P' being provided for the transfer of the cement from the receptacle to the mold.

The mold proper may be constructed of any suitable materials, but I preferably construct the members M M' of sheet iron, of about one-eighth or three-sixteenths of an inch in thickness.

When blocks are to be molded, the various members of the mold proper are closed together, as seen in Fig. 1, and a mandrel R having been inserted through opening $G^{15}$, the cement is filled in, and after being allowed to partially set, the mandrel is removed and then the member $M^7$ is swung outwardly by means of rod J, carrying with it the partially hardened block which rests on the member $G^6$; after the block has been sufficiently dried it may be removed and the mold again closed for molding another block.

The block S, seen more plainly in Fig. 3, as produced by my device, will have the particular configuration seen in said Fig. 3, it having the air passage O, tenon O', on one side, the groove $O^2$ on the opposite side, and the plane faces $O^3$, $O^4$ and $O^5$ and curved faces $O^6$.

When the blocks are set up in a wall, for instance, as seen in Fig. 6, the blocks will interlock. Furthermore, the additional air passages $O^{10}$ will be formed by the curved faces $O^6$ of two adjacent blocks and the plane face $O^4$ of a third adjacent block.

In Figs. 4 and 5 I show corner blocks indicated by T and U respectively. The said corner blocks are produced by simply passing a dividing plate down through the partially set block while the latter is still in the mold, the block T is about three-fourths the size of the complete, full-sized block S, seen in Fig. 3, and having only one curved face T' and groove T'', and aperture $T^2$, while the block U is only about one-half the size of the block S and having but one curved face U' and groove $U^2$.

By the described configuration of the blocks produced by my device, a very strong wall will be produced, and, furthermore, by the formation of the various air passages, dampness will be prevented from gaining access to the interior of the structure.

The blocks may be made of various sizes, as desired, the mold being, of course, made in various sizes accordingly.

What I claim is:—

1. In an apparatus of the character described the combination with a supporting frame, of a mold comprising four coöperating rectangularly arranged members forming the sides of the mold, one of which members is fixed and the other members being pivotally mounted at their lower ends and all the members being arranged relatively to each other so that when the pivoted members are swung upwardly the various members form a receptacle to receive the material to be molded, one of the pivoted members opposite to the fixed member consisting of two right-angularly arranged integral sections, one of which is adapted to form the floor of the mold when the latter is in molding position and the other pivoted members being arranged opposite to each other and each consisting of an upper and a lower section pivoted horizontally together, the upper pivoted sections being provided the one with a horizontal groove and the other with a horizontal tenon, and the said fixed side member of the mold and the pivoted side member opposite thereto being each provided at one lateral edge with a tenon and in the other lateral edge with a groove, the various grooves and tenons being disposed and adapted to interlock substantially in the manner set forth when the side members are closed together in the molding position.

2. In an apparatus of the character described the combination with a supporting frame, of a mold comprising four coöperating rectangularly-arranged members forming the sides of the mold, one of which members is fixed and the other members being pivotally mounted at their lower ends, and all the members being arranged relatively to each other so that when the pivoted members are swung upwardly the various members form a receptacle to receive the material to be molded, one of the pivoted members opposite to the fixed member consisting of two right-angularly arranged integral sections one of which is adapted to form the floor of the mold when the latter is in molding position and the other pivoted members being arranged opposite to each other and each consisting of an upper and a lower section pivoted horizontally together, one of the upper pivoted sections being provided with a horizontal groove and the other with a horizontal tenon and the lower pivoted sections having curved portions and also having horizontal plane portions, the said fixed side member of the mold and the pivoted side member opposite thereto being each provided at one side with vertical plane edges and intermediate curved edges and a groove intermediate one of said curved edges and the adjacent plane edge, and at the other side with vertical plane edges and intermediate curved edges and a tenon intermediate one of the latter plane edges and the adjacent curved edge, the various side members being adapted to be brought into a position relatively to each other with the various tenons and grooves interlocking, substantially in the manner set forth.

In testimony whereof I affix my signature in presence of two witnesses.

ANDREW RING.

Witnesses:
F. W. COATES,
L. LINDENBERG.